(No Model.)
J. WALKER.
FRICTION CLUTCH.
No. 424,631. Patented Apr. 1, 1890.
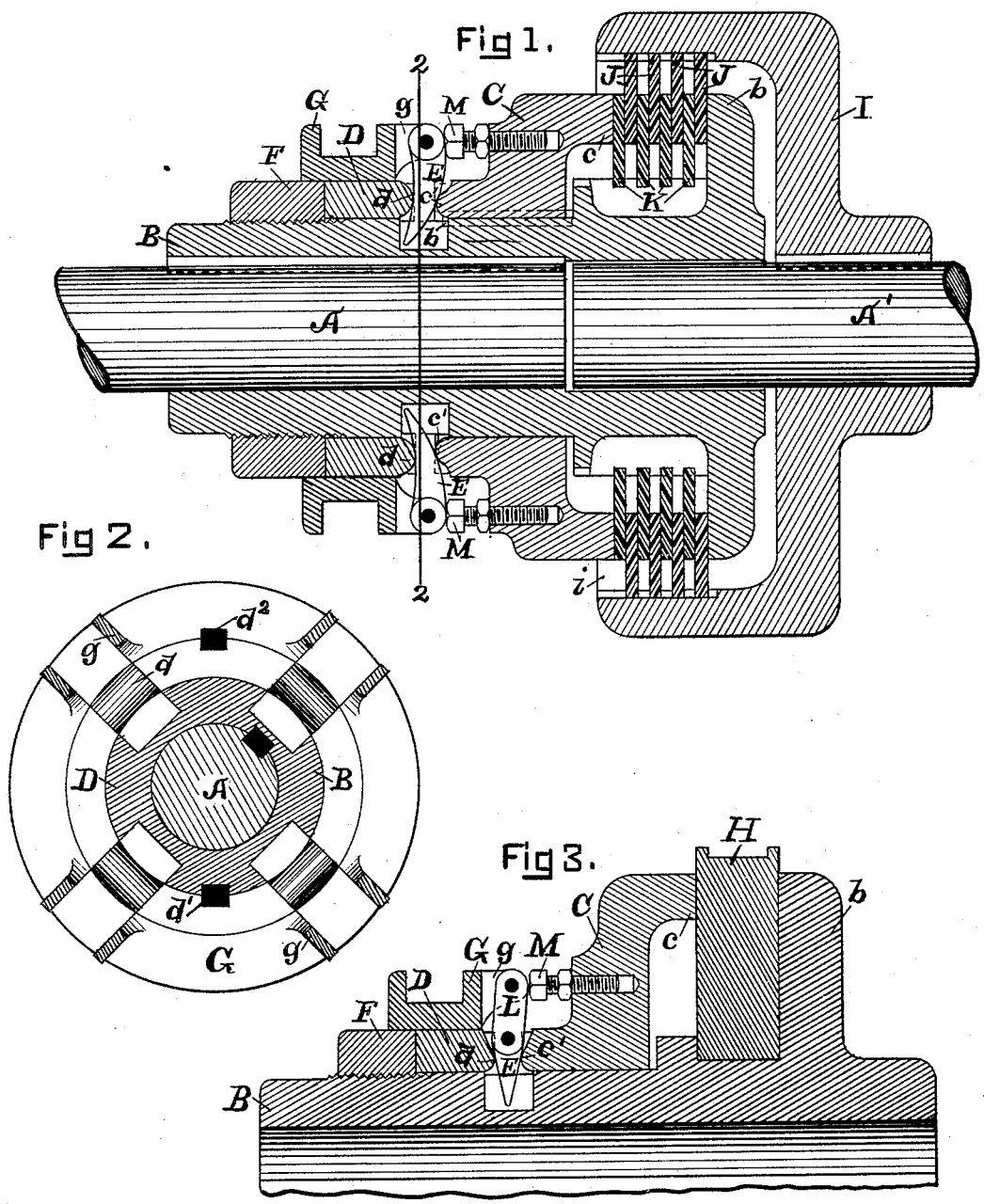
WITNESSES.
Frank Miller.
W. J. Bainbridge
INVENTOR.
John Walker
By his attorneys
Watson + Thurston

UNITED STATES PATENT OFFICE.

JOHN WALKER, OF CLEVELAND, OHIO.

FRICTION-CLUTCH.

SPECIFICATION forming part of Letters Patent No. 424,631, dated April 1, 1890.

Application filed November 11, 1889. Serial No. 329,905. (No model.)

*To all whom it may concern:*

Be it known that I, JOHN WALKER, a citizen of the United States, residing at Cleveland, in the county of Cuyahoga and State of Ohio, have invented certain new and useful Improvements in Friction-Clutches, of which the following is a full, clear, and exact description.

My invention relates to that class of friction-clutches in which one friction member is moved lengthwise of the shaft toward another member for the purpose either of causing frictional engagement between the two or of grasping between them an interposed drum, disk, or series of disks. The above-mentioned class of devices are employed both to frictionally couple together two independently-revoluble shafts arranged in the same axial line and to connect at will a shaft and a pulley loosely mounted thereon. The drawings show both applications of the device.

The object of my invention is to provide appropriate operating mechanism for moving the slidable member lengthwise of the shaft for the purpose of producing the frictional engagement desired.

To this end it consists of the construction and combination of parts hereinafter described, and pointed out definitely in the claims.

In the drawings, Figure 1 is a central longitudinal sectional view of a well-known form of shaft-coupling provided with my improved operating mechanism. Fig. 2 is a transverse sectional view thereof on the line 2 2 of Fig. 1. Fig. 3 is a central longitudinal sectional view of another well-known form of clutch mechanism provided with my improved operating mechanism.

Like letters represent similar parts in the several figures.

Referring to the parts by letter, A represents a shaft.

B represents a long hub, which is secured to the shaft by a key or other appropriate means, and which is provided at one end with an annular disk-like flange $b$.

C represents a sleeve, which is provided with an annular flange $c$, and which surrounds said hub, and is connected therewith by a spline $b'$ or its equivalent, whereby the sleeve is compelled to revolve with the hub, but is permitted to move longitudinally thereon. Between the two flanges $b$ and $c$ is placed the part to be frictionally engaged. In Fig. 3 this part is shown as a drum or pulley H, having friction-surfaces upon its sides, which is mounted loosely upon the hub B. When the flange $c$ is moved toward the flange $b$, this drum or pulley H is gripped between them and compelled to revolve as the shaft A revolves.

In Fig. 1 a shaft-coupling is shown, and in this figure A' represents a shaft arranged in the same axial line with the shaft A. Secured thereto by a key or its equivalent is a disk I, having the cylindric flange $i$ concentric with the shaft, and extending to about the same plane of the friction-surface on the flange $c$.

J J represent friction-disks, which are connected with the inner surface of the cylindric flange I by means of tongues on the disks and grooves in the inner face of the flange, whereby said disks are made to revolve with the flange I, but are permitted to move lengthwise of the shaft. Alternating with the disks J are a series of disks K, which are connected with the hub B in a manner which compels them to revolve with the hub, but permits them to slide lengthwise of the shaft. When the flange $c$ is moved sufficiently near the flange $b$, the disks J and K are pressed together, thereby producing their frictional engagement and causing a common state of rest or motion between the two shafts to which they are respectively connected.

So much of the two forms of the device shown in the drawings as already explained is, I believe, old in the art. My invention relates to the operating mechanism whereby the pressure-disk $c$ is moved lengthwise of the shaft for the purpose of producing the frictional engagement between the friction-surfaces.

D represents a collar, the essential characteristic of which is, that it is rigid with the shaft when the clutch is being closed or held closed. In order that I may be able to adjust the clutch to compensate for wear, this collar D is mounted on the hub B and connected therewith by means of a spline $d'$ or its equivalent, and it is moved toward the sleeve C and prevented from moving away from it by the nut F, which screws onto said hub B, as shown, and abuts against the end of said collar D. At suitable intervals the proximate faces of the collar D and sleeve C are curved, substantially as shown at $d$ and $c'$, and the curved surfaces are nicely finished and serve as the bearing-surfaces against which the wedges hereinafter described act. The wedges, which are represented by E E, have their points inserted between the curved bearing-surfaces $d$ and $c'$. As the points of these wedges are moved toward the axis of the shaft, the sleeve C is forced away from the collar D, thereby producing the engagement of the friction-surfaces. Four of these wedges are employed in the form of device illustrated in the drawings, this being a sufficient number to produce the requisite power and an even motion to the sleeve C. The number which is employed, however, is not material.

G represents what is commonly known as the "shifting sleeve," which is mounted on the collar D by a spline $d^2$ or its equivalent. Upon that end of the sleeve G nearest the sleeve C are formed the lugs $g$, to which, in the form of the device shown in Fig. 1, (which is, in my opinion, the best form,) are pivoted the upper ends of the curved wedges E. As the sleeve G is moved toward the sleeve C, the points of these curved wedges are forced inward toward the axis of the shaft, thereby moving the sleeve C and producing the frictional engagement, as explained.

In Fig. 3 the wedges shown are straight—that is, not curved—and are connected with the lugs $g$ by means of the links L, which are pivoted at their ends, respectively, to the lugs $g$ and to the top of the wedges. Below the points of the wedges in both forms the hub B is cut away, thereby forming pockets into which the points of the wedges may enter. When the pivots which connect the wedges with the lugs $g$ have reached or passed a transverse plane midway between the bearing-surfaces $d$ and $c'$, the device becomes locked. In order that the shifting sleeve G shall have no further forward motion practically beyond this locking-point, we provide the set-bolts M, which screw into the sleeve C at points where their ends will abut against the lugs $g$ or the wedges E.

Having thus described my invention, what I claim as new, and desire to secure by Letters Patent, is—

1. In a friction-clutch, in combination, a sleeve C, surrounding the shaft, having a movement lengthwise thereof, and provided at one end with a pressure-flange, a collar D, rigidly fixed with reference to the shaft, said sleeve and collar being provided with suitable bearing-surfaces, wedges extending between said bearing-surfaces, and suitable means for moving the points of said wedges toward the axis of the shaft, whereby the sleeve C is caused to move away from the collar D, substantially as and for the purpose specified.

2. In a friction-clutch, in combination, a hub rigidly attached to the shaft and having a pressure-flange at one end, a sleeve slidable upon said hub and provided also with a pressure-flange, a collar fixed to said hub, said collar and sleeve being provided with suitable bearing-surfaces, wedges extending between said bearing-surfaces, a shifting sleeve, and suitable connections between said wedges and the shifting sleeve, whereby the points of said wedges are moved toward and from the axis of the shaft, substantially as and for the purpose specified.

3. In a friction-clutch, in combination, a hub B, rigid with the shaft and having the flange $b$, the sleeve C, slidable upon the hub and having the flange $c$, collar D, rigidly fixed with reference to the shaft, said sleeve and collar being provided with curved bearing-surfaces, curved wedges extending between said bearing-surfaces and having their points directed toward the axis of the shaft, a shifting sleeve, and pivotal connections between said shifting sleeve and wedges, substantially as and for the purpose specified.

4. In a friction-clutch, in combination, a hub B, rigid with the shaft and having the flange $b$, a sleeve C, slidable upon the hub and having the flange $c$, collar D, adjustably secured to said hub, a shifting sleeve slidable upon said collar D, wedges pivotally connected with said shifting sleeve and lying between the sleeve C and collar D, and having their points directed toward the axis of the shaft, and set-bolts M, substantially as and for the purpose specified.

5. In a friction-clutch, in combination, a hub B, rigid with the shaft and having a pressure-flange $b$, a sleeve C, slidable upon said hub and having a pressure-flange $c$, a collar D, slidable upon said hub, suitable mechanism for preventing the revolution of said sleeve C and collar D upon said hub, an adjustable nut F, which abuts against said collar D, and suitable mechanism for thrusting in opposite directions upon said collar D and sleeve C, whereby the sleeve C is caused to move away from the collar D, substantially as and for the purpose specified.

JOHN WALKER.

Witnesses:
E. L. THURSTON,
FRANK MILLER.